(12) United States Patent
Tsuruta et al.

(10) Patent No.: US 11,909,305 B2
(45) Date of Patent: Feb. 20, 2024

(54) AC-TO-DC POWER CONVERTER WHICH REMOVED A COMMON MODE COMPONENT FORM THE OUTPUT CURRENT

(71) Applicant: Mitsubishi Electric Corporation, Tokyo (JP)

(72) Inventors: Ryoji Tsuruta, Tokyo (JP); Tsuguhiro Takuno, Tokyo (JP); Takushi Jimichi, Tokyo (JP); Kikuo Izumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 17/618,892

(22) PCT Filed: Aug. 30, 2019

(86) PCT No.: PCT/JP2019/034093
§ 371 (c)(1),
(2) Date: Dec. 14, 2021

(87) PCT Pub. No.: WO2021/038823
PCT Pub. Date: Mar. 4, 2021

(65) Prior Publication Data
US 2022/0255419 A1    Aug. 11, 2022

(51) Int. Cl.
*H02M 1/00* (2006.01)
*H02M 1/42* (2007.01)
(Continued)

(52) U.S. Cl.
CPC ........... *H02M 1/123* (2021.05); *H02M 1/009* (2021.05); *H02M 1/0009* (2021.05); *H02M 1/08* (2013.01);
(Continued)

(58) Field of Classification Search
CPC ...... H02M 1/0009; H02M 1/009; H02M 1/08; H02M 1/123; H02M 1/4233; H02M 7/2173; H02M 7/219
See application file for complete search history.

(56) References Cited

U.S. PATENT DOCUMENTS

2011/0127837 A1*  6/2011  Sato ..................... H02J 9/062
                                                                  307/66
2011/0134672 A1    6/2011  Sato et al.
(Continued)

FOREIGN PATENT DOCUMENTS

EP    2624433 A1 *  8/2013   .............. H02M 1/12
JP    59-220075 A   12/1984
(Continued)

OTHER PUBLICATIONS

International Search Report and Written Opinion dated Nov. 19, 2019, received for PCT Application PCT/JP2019/034093, Filed on Aug. 30, 2019, 9 pages including English Translation.

*Primary Examiner* — Sisay G Tiku
(74) *Attorney, Agent, or Firm* — XSENSUS LLP

(57) ABSTRACT

An object is to obtain a power conversion device that can stabilize output voltage to a DC load. A power conversion device includes an AC/DC conversion unit having a power conversion circuit composed of a plurality of first semiconductor switching elements connected in a full-bridge form, and a full-bridge chopper circuit unit having a full-bridge chopper circuit composed of a plurality of second semiconductor switching elements connected in a full-bridge form, and connected to a positive terminal and a negative terminal. A neutral point of an AC filter capacitor unit and a neutral point of a DC filter capacitor unit are connected via a neutral point line.

20 Claims, 9 Drawing Sheets

(51) Int. Cl.
     *H02M 7/217*      (2006.01)
     *H02M 7/219*      (2006.01)
     *H02M 1/12*       (2006.01)
     *H02M 1/08*       (2006.01)

(52) U.S. Cl.
     CPC ......... *H02M 1/4233* (2013.01); *H02M 7/219* (2013.01); *H02M 7/2173* (2013.01)

(56) References Cited

U.S. PATENT DOCUMENTS

| | | | |
|---|---|---|---|
| 2011/0170322 A1* | 7/2011 | Sato | H02M 7/487 363/40 |
| 2016/0315540 A1 | 10/2016 | Dilley et al. | |
| 2018/0278161 A1* | 9/2018 | Dilley | H02M 3/158 |
| 2021/0013796 A1* | 1/2021 | Amimoto | H02M 1/4208 |
| 2023/0170826 A1* | 6/2023 | Kawai | H02M 7/53871 363/41 |
| 2023/0223862 A1* | 7/2023 | Takuno | H02M 3/158 307/11 |

FOREIGN PATENT DOCUMENTS

| | | | | |
|---|---|---|---|---|
| JP | 4-46568 A | 2/1992 | | |
| JP | 6-315277 A | 11/1994 | | |
| JP | 9-294381 A | 11/1997 | | |
| JP | 2013-176296 A | 9/2013 | | |
| JP | 6771693 B1 * | 10/2020 | .......... | H02M 1/0009 |
| WO | WO-2023012963 A1 * | 2/2023 | | |
| WO | WO-2023152860 A1 * | 8/2023 | | |
| WO | WO-2023166544 A1 * | 9/2023 | | |

\* cited by examiner

AC-TO-DC POWER CONVERTER WHICH REMOVED A COMMON MODE COMPONENT FORM THE OUTPUT CURRENT

CROSS-REFERENCE TO RELATED APPLICATION

The present application is based on PCT filing PCT/JP2019/034093, filed Aug. 30, 2019, the entire contents of which are incorporated herein by reference.

TECHNICAL FIELD

The present disclosure relates to a power conversion device that converts alternating-current (AC) voltage to direct-current (DC) voltage and further converts the DC voltage to desired DC voltage.

BACKGROUND ART

In a power conversion device for converting AC voltage to DC voltage, it is necessary to stabilize output voltage. In a conventional power conversion device, neutral points of filter capacitors at the input and the output are connected for the purpose of suppressing common-mode current (see, for example, Patent Document 1).

CITATION LIST

Patent Document

Patent Document 1: Japanese Laid-Open Patent Publication No. 9-294381 (paragraphs [0013] to [0015] of specification and FIG. 3)

SUMMARY OF THE INVENTION

Problems to be Solved by the Invention

The above power conversion device of Patent Document 1 is configured to convert AC voltage to DC voltage and further convert the DC voltage to AC voltage, and thus the input and the output both have AC voltage.

In recent years, a DC distribution system for performing power supply to various electric devices with DC power has been proposed. The DC distribution system needs a power conversion device for converting three-phase AC voltage to desired DC voltage and outputting the converted DC voltage. Also in this case, it is required to stabilize the output voltage from the power conversion device.

The present disclosure has been made to solve the above problem, and an object of the present disclosure is to obtain a power conversion device that can stabilize output voltage to a DC load.

Solution to the Problems

A power conversion device according to the present disclosure is a power conversion device which converts AC voltage from an AC power supply to DC voltage, further converts the DC voltage to desired DC voltage, and outputs the desired DC voltage to a DC load via a positive terminal and a negative terminal, the power conversion device including: a power conversion circuit which includes a plurality of first semiconductor switching elements connected in a bridge form, and which converts the AC voltage to DC voltage and outputs the DC voltage as DC link voltage; an AC filter capacitor unit connected between the AC power supply and the power conversion circuit, and having capacitors corresponding to respective phases of the AC voltage; a full-bridge chopper circuit including a plurality of second semiconductor switching elements connected so as to form a full-bridge circuit, the full-bridge chopper circuit having a positive leg and a negative leg respectively connected to the positive terminal and the negative terminal; a DC filter capacitor unit and a DC filter reactor unit connected between the full-bridge chopper circuit, and the positive terminal and the negative terminal; a neutral point line which connects a neutral point of the AC filter capacitor unit and a neutral point of the DC filter capacitor unit and through which a potential at the neutral point of the AC filter capacitor unit and a potential at the neutral point of the DC filter capacitor unit are made to be a common neutral point potential, the neutral point line not being connected to a ground point of which a potential is a ground potential; a controller for controlling the first semiconductor switching elements and the second semiconductor switching elements; and a current detection unit for detecting output current from the full-bridge chopper circuit. The controller controls the plurality of second semiconductor switching elements on the basis of an output current command based on a predetermined value of output voltage, and a current detection value obtained by removing a common-mode component from the output current detected by the current detection unit. The AC power supply includes a transformer of which a neutral point on an output side is grounded, and a potential of the neutral point line is equal to the ground potential.

Effect of the Invention

The power conversion device according to the present disclosure can stabilize output voltage to a DC load.

DESCRIPTION OF EMBODIMENTS

Embodiment 1

Figure 1:
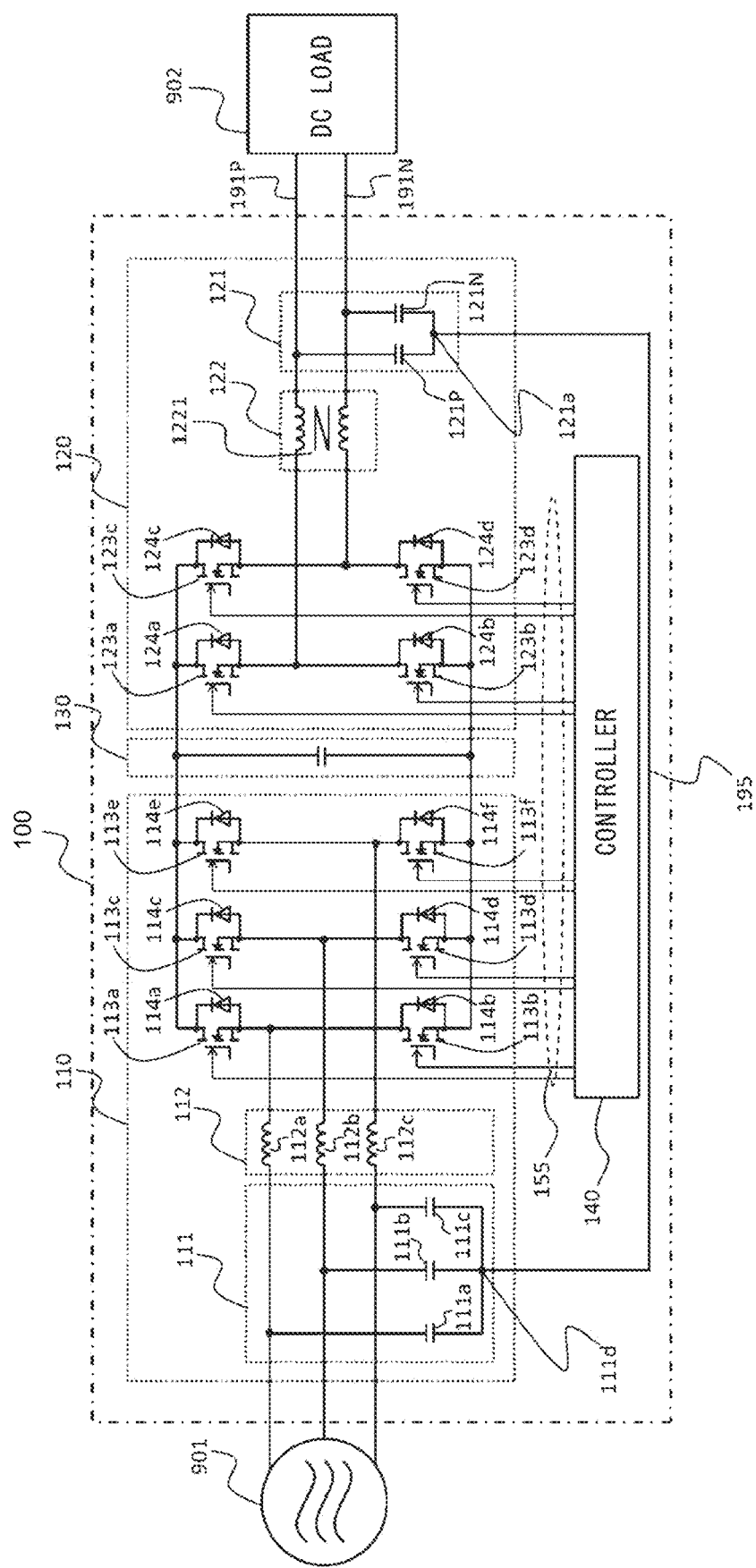
FIG. 1 is a circuit diagram showing a configuration example of a power conversion device according to embodiment 1.

Embodiment 1 will be described with reference to FIG. 1 to FIG. 9. FIG. 1 is a circuit diagram showing a configuration example of a power conversion device according to embodiment 1. For a power conversion device 100, a commercial power supply 901 for supplying three-phase AC voltage, i.e., an AC power supply, is connected to the input side, and a DC load 902 is connected to the output side. The power conversion device 100 is connected to the DC load 902 via a positive terminal 191P and a negative terminal 191N which are output terminals. The power conversion device 100 converts AC voltage supplied from the commercial power supply 901, to desired DC voltage, and supplies the DC voltage to the DC load 902. The power conversion device 100 is roughly composed of an AC/DC conversion unit 110 and a full-bridge chopper unit 120. In addition, the power conversion device 100 includes a DC link capacitor unit 130 connected between the AC/DC conversion unit 110 and the full-bridge chopper unit 120, and a controller 140 for controlling semiconductor switching elements provided in the AC/DC conversion unit 110 and the full-bridge chopper unit 120 by gate signals 155. In general, the frequency of AC voltage supplied from the commercial power supply 901 is 50 Hz or 60 Hz, but is not limited thereto.

The AC/DC conversion unit 110 converts the AC voltage supplied from the commercial power supply 901 to DC voltage. The AC/DC conversion unit 110 includes, in the order from the commercial power supply 901 side, an AC filter capacitor unit 111, an AC filter reactor unit 112, and first semiconductor switching elements 113a to 113f and first flyback diodes 114a to 114f. The order of the AC filter capacitor unit 111 and the AC filter reactor unit 112 as seen from the commercial power supply 901 side is not limited to the above order.

The AC filter capacitor unit 111 is composed of three capacitors 111a to 111c corresponding to respective phases of the three-phase AC voltage and connected in three-phase star-connection form. A neutral point line 195 is connected to a neutral point 111d of the capacitors 111a to 111c.

The AC filter reactor unit 112 is composed of three reactors 112a to 112c corresponding to respective phases of the three-phase AC voltage. Here, the three reactors 112a to 112c are individually connected, but instead, a three-phase reactor may be used. In this case, size reduction and cost reduction can be achieved as compared to the case of using the three reactors 112a to 112c individually.

The six first semiconductor switching elements 113a to 113f and the six first flyback diodes 114a to 114f are respectively connected in antiparallel, and the first semiconductor switching elements 113a to 113f and the first flyback diodes 114a to 114f respectively connected in antiparallel form three upper arms and three lower arms. The upper arms and the lower arms are respectively connected in series, to form legs for three phases corresponding to the respective phases of the three-phase AC voltage, and thus, as a whole, a 2-level three-phase bridge circuit, i.e., power conversion circuit, is formed. For example, the leg corresponding to U phase is formed by connecting, in series, the positive-side upper arm composed of the first semiconductor switching element 113a and the first flyback diode 114a, and the negative-side lower arm composed of the first semiconductor switching element 113b and the first flyback diode 114b. Similarly, the leg corresponding to V (W) phase is formed by connecting, in series, the positive-side upper arm composed of the first semiconductor switching element 113c (113e) and the first flyback diode 114c (114e), and the negative-side lower arm composed of the first semiconductor switching element 113d (113f) and the first flyback diode 114d (114f). The first semiconductor switching elements 113a to 113f are mutually turned on and off repeatedly by the gate signals 155 from the controller 140. Thus, the AC voltage supplied from the AC filter reactor unit 112 is converted to DC link voltage which is direct-current voltage, and the DC link voltage is supplied to the full-bridge chopper unit 120 via the DC link capacitor unit 130. As an ON/OFF control method for the first semiconductor switching elements 113a to 113f, for example, pulse width modulation (PWM) may be used.

The DC link capacitor unit 130 is connected between the AC/DC conversion unit 110 and the full-bridge chopper unit 120. The DC link capacitor unit 130 is provided on a line connecting the positive side and the negative side and is formed by a capacitor, to remove a ripple component superimposed on the DC link voltage from the AC/DC conversion unit 110.

Figure 2:
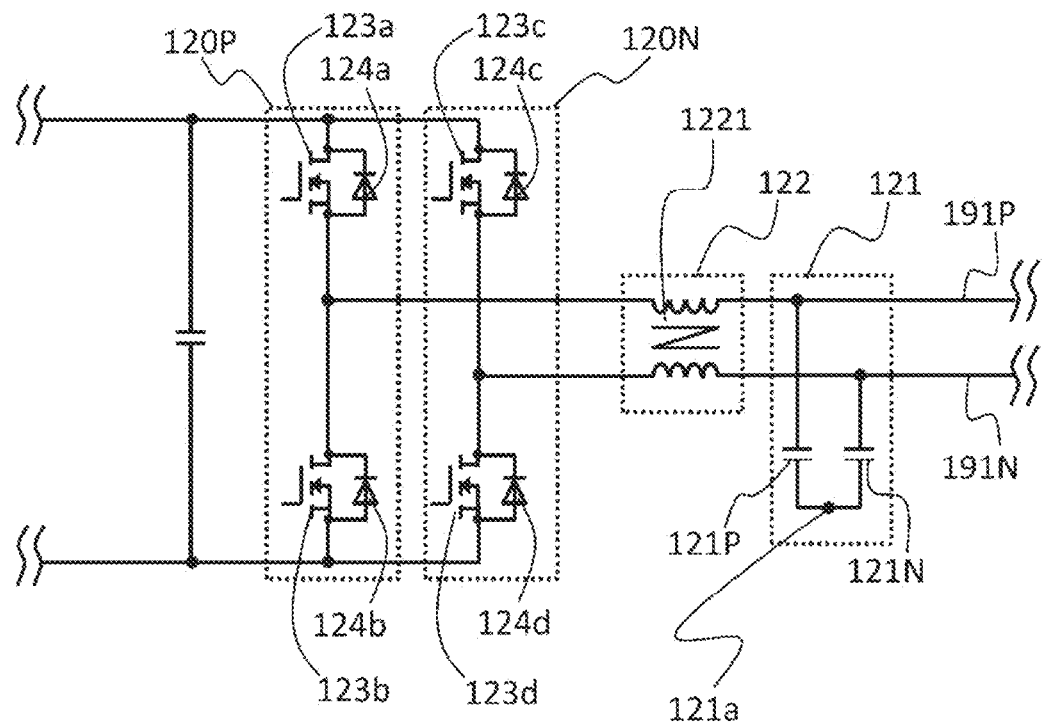
FIG. 2 is a circuit diagram showing a configuration example of a full-bridge chopper unit according to embodiment 1.

The details of the full-bridge chopper unit 120 will be described. FIG. 2 is a circuit diagram showing a configuration example of the full-bridge chopper unit according to embodiment 1. As shown in FIG. 2, the full-bridge chopper unit 120 includes, in the order from the DC load 902 side, a DC filter capacitor unit 121, a DC filter reactor unit 122, and second semiconductor switching elements 123a to 123d and second flyback diodes 124a to 124d. The full-bridge chopper unit 120 is connected to the DC load 902 via a positive leg 120P connected to the positive terminal 191P and the negative terminal 191N. The order of the DC filter capacitor unit 121 and the DC filter reactor unit 122 as seen from the DC load 902 side is not limited to the above order.

The DC filter capacitor unit 121 is formed by connecting two capacitors 121P, 121N in series via a neutral point 121a. The capacitor 121P has one end connected to the positive terminal 191P and another end connected to the neutral point 121a. The capacitor 121N has one end connected to the neutral point 121a and another end connected to the negative terminal 191N. That is, the DC filter capacitor unit 121 has a series connection set of the capacitor connected to the positive terminal 191P and the capacitor connected to the negative terminal 191N. The neutral point 121a is connected to the neutral point line 195. As described above, the neutral point line 195 is connected to the neutral point 111d of the AC filter capacitor unit 111, and therefore the neutral point 121a and the neutral point 111d are connected to each other via the neutral point line 195. Thus, the AC filter capacitor unit 111 on the input side and the DC filter capacitor unit 121 on the output side are equal to each other in their neutral point potentials, and have a common neutral point potential.

Figure 3:
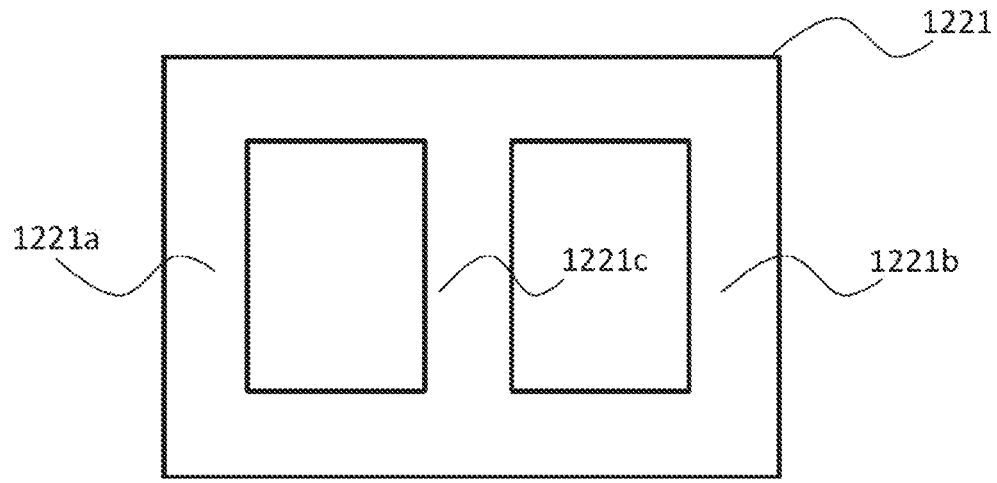
FIG. 3 is a schematic configuration diagram showing a three-leg core according to embodiment 1.

The DC filter reactor unit 122 is formed by a three-leg core 1221 shown in FIG. 3. The three-leg core 1221 has three leg portions 1221a to 1221c formed integrally. The leg portion 1221a is wound with a winding connected to the positive terminal 191P, and the leg portion 1221b is wound with a winding connected to the negative terminal 191N. The leg portions 1221a to 1221c respectively correspond to a first leg portion, a second leg portion, and a third leg portion. The windings wound around the leg portions 1221a and 1221b as described above form reactors, whereby, when a magnetic flux is generated by current flowing through each winding, any leg portion can serve as a path for the magnetic flux. Therefore, the three-leg core 1221 has a great inductance with respect to common-mode-component current.

The four second semiconductor switching elements 123a to 123d and the four second flyback diodes 124a to 124d are respectively connected in antiparallel, and the second semiconductor switching elements 123a to 123d and the second flyback diodes 124a to 124d respectively connected in antiparallel form two upper arms and two lower arms. The upper arms and the lower arms are respectively connected in series, to form two legs, i.e., the positive leg 120P corresponding to the positive terminal 191P and the negative leg 120N corresponding to the negative terminal 191N, and thus, as a whole, a full-bridge chopper circuit is formed. The positive leg 120P (negative leg 120N) is formed by connecting, in series, the upper arm composed of the second semiconductor switching element 123a (123c) and the second flyback diode 124a (124c), and the lower arm composed of the second semiconductor switching element 123b (123d) and the second flyback diode 124b (124d). The connection points between the upper arms and the lower arms serve as output terminals of the respective legs, and are respectively connected to the positive leg 120P and the negative terminal 191N. The second semiconductor switching elements 123a to 123d are mutually turned on and off repeatedly by the gate signals 155 from the controller 140. Thus, the DC link voltage supplied from the AC/DC conversion unit 110 via the DC link capacitor unit 130 is converted to DC voltage having a desired magnitude. As an ON/OFF control method for the second semiconductor switching elements 123a to 123d, for example, PWM may be used.

Since the full-bridge chopper circuit has a symmetric configuration with respect to the positive terminal 191P and the negative terminal 191N, the voltages outputted to the positive terminal 191P and the negative terminal 191N are positive-negative symmetric with respect to the potential at the neutral point 121a of the DC filter capacitor unit 121. As described later, in embodiment 1, the potential at the neutral point 121a can be considered to be equal to the ground potential, and therefore the potentials of the positive terminal 191P and the negative terminal 191N are positive-negative symmetric with respect to the ground potential.

Figure 4:
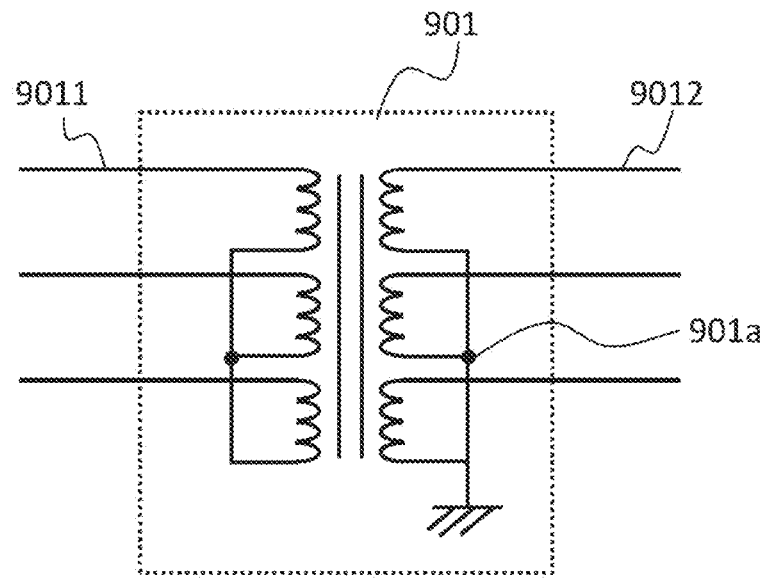
FIG. 4 is a circuit diagram showing a configuration example of a commercial power supply according to embodiment 1.

The commercial power supply 901 will be described in detail. FIG. 4 is a circuit diagram showing a configuration example of the commercial power supply according to embodiment 1. As shown in FIG. 4, the commercial power supply 901 has a transformer configuration, steps down grid voltage (e.g., 6.6 kV) supplied to a primary-side coil 9011 so that the voltage is adjusted to be appropriate for a consumer, and supplies the stepped-down AC voltage from a secondary-side coil 9012. In embodiment 1, a neutral point 901a on the secondary side, i.e., the output side, is grounded. Therefore, the potential at the neutral point 901a is equal to the ground potential. In addition, the potentials at the neutral point 111d on the input side and the neutral point 121a on the output side of the power conversion device 100 are, ideally, equal to the potential at the neutral point 901a of the commercial power supply 901. Therefore, even if the neutral point 111d and the neutral point 121a are not grounded, the neutral point 111d and the neutral point 121a can be virtually regarded as being grounded. That is, in embodiment 1, the potentials at the neutral point 111d and the neutral point 121a can be considered to be equal to the ground potential.

It can also be assumed that the neutral point 901a is not grounded. In such a case, the potential at the neutral point 901a, i.e., zero-phase voltage of the commercial power supply 901 may be adjusted to be zero. Thus, the same effect as in the case of grounding the neutral point 901a can be obtained. The zero-phase voltage of the commercial power supply 901 can be adjusted by the controller 140 controlling the first semiconductor switching elements 113a to 113f.

Figure 5:
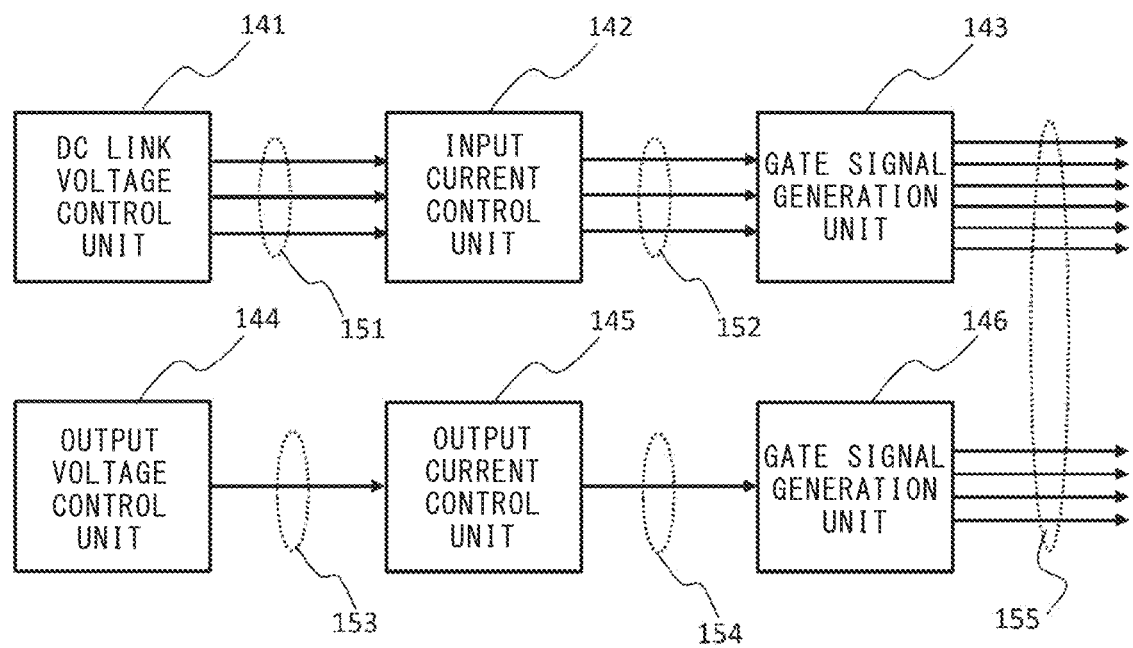
FIG. 5 is a block diagram showing the configuration of a controller according to embodiment 1.

The controller 140 will be described in detail. FIG. 5 is a block diagram showing the configuration of the controller according to embodiment 1. The controller 140 performs control for the DC link voltage and control for output voltage in parallel. Here, the "output voltage" is voltage between the positive terminal 191P and the negative terminal 191N. The controller 140 includes, as a configuration for controlling the DC link voltage, a DC link voltage control unit 141 for generating input current commands 151 based on a desired value of the DC link voltage, an input current control unit 142 for generating AC/DC conversion voltage commands 152 on the basis of the input current commands 151 and actual input current, and a gate signal generation unit 143 for generating the gate signals 155 for controlling the first semiconductor switching elements 113a to 113f on the basis of the AC/DC conversion voltage commands 152. Here, the "input current" is current flowing through the AC filter reactor unit 112 of the AC/DC conversion unit 110. In addition, the controller 140 includes, as a configuration for controlling the output voltage, an output voltage control unit 144 for generating an output current command 153 based on a desired value of the output voltage, an output current control unit 145 for generating a full-bridge chopper voltage command 154 on the basis of the output current command 153 and actual output current, and a gate signal generation unit 146 for generating the gate signals 155 for controlling the second semiconductor switching elements 123a to 123d on the basis of the full-bridge chopper voltage command 154. Here, the "output current" is current flowing through the DC filter reactor unit 122 of the full-bridge chopper unit 120.

The DC link voltage control unit 141 calculates values of the input current commands 151 for the three phases so that the DC link voltage becomes the desired value, and outputs the generated input current commands 151 to the input current control unit 142. The input current control unit 142 calculates values of the AC/DC conversion voltage commands 152 for the three phases so that currents supplied from the commercial power supply 901 are balanced among the three phases and have ideal sinewaves, on the basis of the input current commands 151 and actual input current, and outputs the generated AC/DC conversion voltage commands 152 to the gate signal generation unit 143. The gate signal generation unit 143 compares the AC/DC conversion voltage commands 152 with a carrier signal, to generate the gate signals 155 for controlling ON/OFF operations of the first semiconductor switching elements 113a to 113f. The gate signal generation unit 143 outputs the generated gate signals 155 to the first semiconductor switching elements 113a to 113f.

The output voltage control unit 144 calculates a value of the output current command 153 so that the output voltage becomes a desired value, and outputs the generated output current command 153 to the output current control unit 145. The output current control unit 145 calculates a value of the full-bridge chopper voltage command 154 on the basis of the output current command 153 and actual output current, and outputs the generated full-bridge chopper voltage command 154 to the gate signal generation unit 146. The gate signal generation unit 146 compares the full-bridge chopper voltage command 154 with a carrier signal, to generate the gate signals 155 for controlling ON/OFF operations of the second semiconductor switching elements 123a to 123d. The gate signal generation unit 146 outputs the generated gate signals 155 to the second semiconductor switching elements 123a to 123d.

Figure 6:
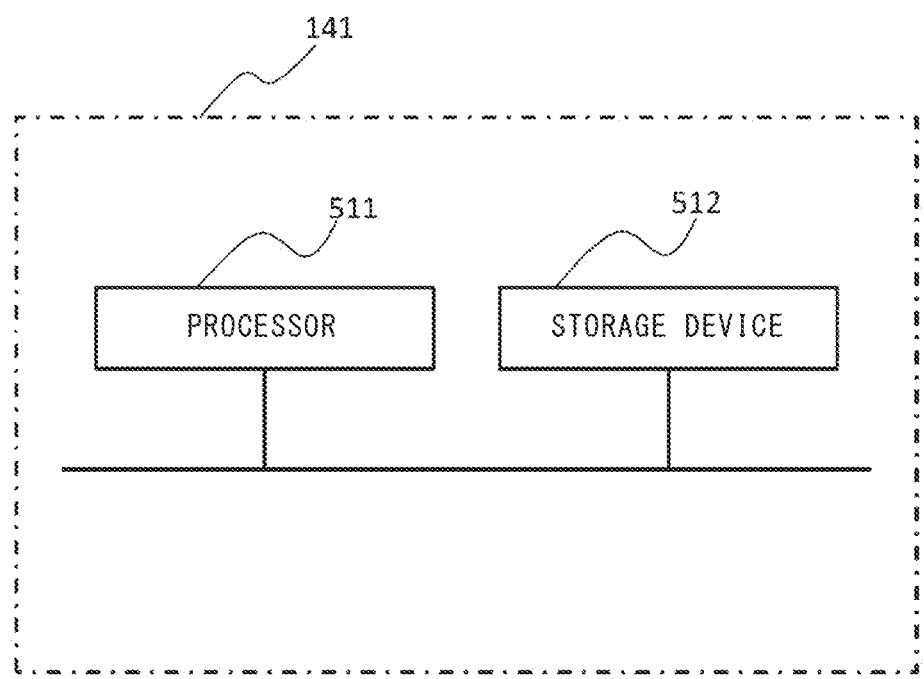
FIG. 6 is a diagram showing an example of the hardware configuration of a DC link voltage control unit according to embodiment 1.

Here, the hardware configuration and the circuit configuration for implementing the function units of the controller 140 will be described. FIG. 6 is a diagram showing an example of the hardware configuration of the DC link voltage control unit according to embodiment 1. The function of the DC link voltage control unit 141 is implemented by a processor 511 executing a program stored in a storage device 512. A plurality of processors 511 and a plurality of storage devices 512 may cooperate to implement the function of the DC link voltage control unit 141. The processor 511 is composed of a central processing unit (CPU), an application specific integrated circuit (ASIC), a digital signal processor (DSP), a field programmable gate array (FPGA), and the like. The storage device 512 is composed of a random access memory (RAM) configured such that data can be read and written by the processor 511, and a read only memory (ROM) configured such that data can be read by the processor 511. The processor 511 reads a program and data needed for calculation from the storage device 512, and executes calculation prescribed by the program, to generate the input current commands 151.

The hardware configurations for implementing the input current control unit 142, the output voltage control unit 144, and the output current control unit 145 are also the same as that for the DC link voltage control unit 141 described above. The processor 511 and the storage device 512 may be shared by the function units.

Figure 7:
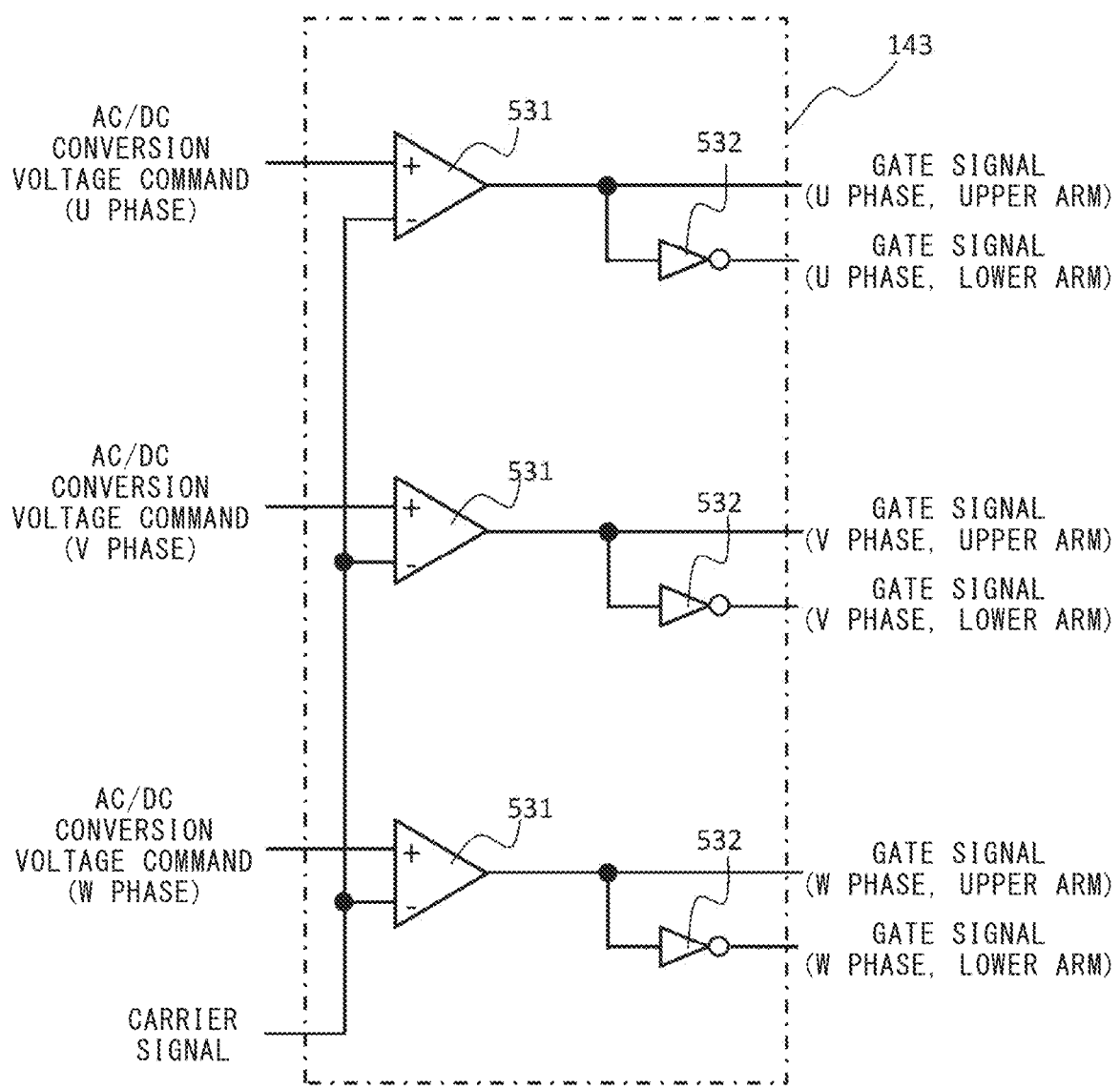
FIG. 7 is a circuit block diagram showing the configuration of a gate signal generation unit according to embodiment 1, and shows the gate signal generation unit for AC/DC conversion.

FIG. 7 is a circuit block diagram showing the configuration of the gate signal generation unit according to embodiment 1, and shows the gate signal generation unit 143 for AC/DC conversion. The gate signal generation unit 143 includes, for each of U phase, V phase, and W phase, a comparator 531 for performing magnitude comparison between the value of the AC/DC conversion voltage command 152 and the value of the carrier signal, and an inversion circuit 532 for inverting the output of the comparator 531. The output of each comparator 531 is divided into the gate signal 155 for the upper arm and the gate signal 155 for the lower arm, which are then outputted to the corresponding ones of the first semiconductor switching elements 113a to 113f. At this time, for the upper arm, the output of the comparator 531 directly becomes the gate signal 155. On the other hand, for the lower arm, a signal obtained by inverting the output of the comparator 531 through the inversion circuit 532 becomes the gate signal 155.

Thus, if the value of the AC/DC conversion voltage command 152 for a given phase is greater than the value of the carrier signal, the gate signal 155 for the first semiconductor switching element of the upper arm for the phase becomes an ON signal, and the gate signal 155 for the first semiconductor switching element of the lower arm becomes an OFF signal. For example, in a case of U phase, an ON signal is sent to the first semiconductor switching element 113a, and an OFF signal is sent to the first semiconductor switching element 113b.

When the gate signal 155 is generated through magnitude comparison between the value of the AC/DC conversion voltage command 152 and the value of the carrier signal as described above, the value of the AC/DC conversion voltage command 152 and the value of the AC/DC conversion unit output voltage become equal to each other in one cycle of switching. Here, the "AC/DC conversion unit output voltage" is output terminal voltage of the leg for each phase with respect to the potential at the neutral point 111d of the AC filter capacitor unit 111. In embodiment 1, as an example, a triangular wave signal is used as the carrier signal. Thus, each of the first semiconductor switching elements 113a to 113f is turned on and off once in one cycle of the triangular wave, so that the frequency of the carrier signal and the switching frequency coincide with each other.

Figure 8:
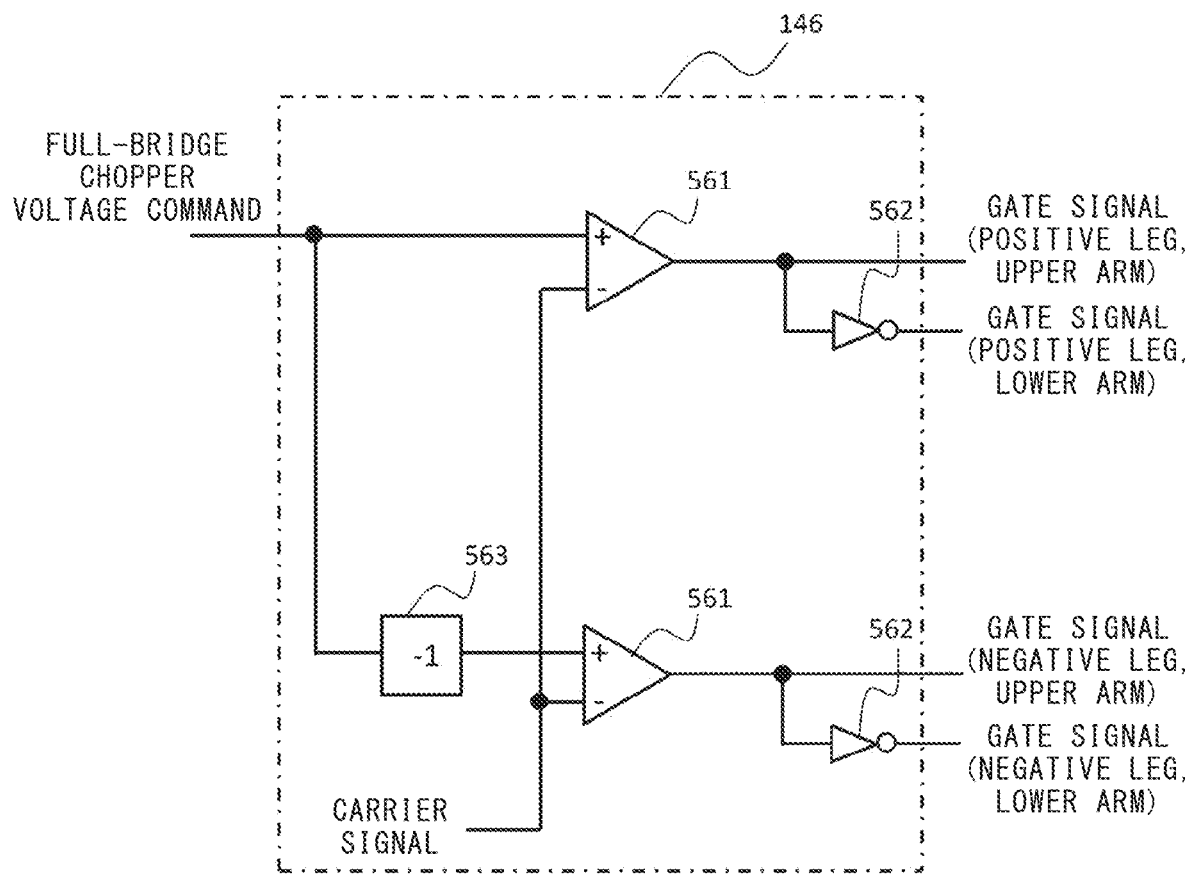
FIG. 8 is a circuit block diagram showing the configuration of the gate signal generation unit according to embodiment 1, and shows the gate signal generation unit for full-bridge chopper.

FIG. 8 is a circuit block diagram showing the configuration of the gate signal generation unit according to embodiment 1, and shows the gate signal generation unit 146 for full-bridge chopper. The gate signal generation unit 146 includes comparators 561 for performing magnitude comparison between the value of the full-bridge chopper voltage command 154 and the value of the carrier signal, inversion circuits 562 for inverting the outputs of the comparators 561, and an inversion unit 563 for inverting the polarity of the full-bridge chopper voltage command 154 by multiplying the value of the full-bridge chopper voltage command 154 by "−1". First, the full-bridge chopper voltage command 154 inputted to the gate signal generation unit 146 is divided into two signals, one of which becomes a voltage command for the positive leg and the other one of which becomes a voltage command for the negative leg. The voltage command for the positive leg is directly inputted to the comparator 561, to be compared with the carrier signal. The sign of the voltage command for the negative leg is inverted through the inversion unit 563, and then the resultant voltage command is inputted to the comparator 561, to be compared with the carrier signal. The output of each comparator 561 is divided into the gate signal 155 for the upper arm and the gate signal 155 for the lower arm, which are then outputted to the corresponding ones of the second semiconductor switching elements 123a to 123d. At this time, for the upper arm, the output of the comparator 561 directly becomes the gate signal 155. On the other hand, for the lower arm, a signal obtained by inverting the output of the comparator 561 through the inversion circuit 562 becomes the gate signal 155.

Thus, if the value of the voltage command for the positive leg or the voltage command for the negative leg is greater than the value of the carrier signal, the gate signal 155 for the second semiconductor switching element of the upper arm of the positive leg 120P or the negative leg 120N becomes an ON signal, and the gate signal 155 for the second semiconductor switching element of the lower arm becomes an OFF signal. In the gate signal generation unit 146, the voltage command for the positive leg, i.e., a first voltage command, and the voltage command for the negative leg, i.e., a second voltage command, which has a polarity inverted from the voltage command for the positive leg, are used with respect to the same carrier signal to perform modulation, thereby generating the gate signals 155. Thus, the positive leg 120P and the negative leg 120N are alternately turned on and off, so that the output of the positive leg 120P and the output of the negative leg 120N become positive-negative symmetric with respect to the neutral point potential (the potential at the neutral point 121a).

When the gate signal 155 is generated through magnitude comparison between the value of the full-bridge chopper voltage command 154 and the value of the carrier signal as described above, the value of the full-bridge chopper voltage command 154 and the value of the output voltage become equal to each other in one cycle of switching. The carrier signal used in the gate signal generation unit 146 may be the same as the carrier signal used in the gate signal generation unit 143, or may be a different carrier signal.

For the gate signal 155, a short-circuit prevention time (dead time) may be imparted by a known method.

As described above, the first semiconductor switching elements 113a to 113f and the second semiconductor switching elements 123a to 123d are subjected to ON/OFF control by the gate signals 155 generated by the respective gate signal generation units 143, 146, whereby the AC voltage supplied from the commercial power supply 901 is converted to DC voltage and the obtained DC voltage is converted so that the output voltage having a desired voltage value can be obtained. Ideally, the sum of the values of the voltage commands for the respective phases of the AC/DC conversion voltage commands 152 and the sum of the values of the full-bridge chopper voltage commands 154 both become zero. This means that a common-mode component, i.e., a zero-phase voltage command value is zero. However, in the actual voltage commands for the respective phases, pulse-shaped outputs are generated through PWM, so that the average value becomes zero but the instantaneous value does not become zero, thus generating a common-mode component. The main component of the common-mode component which is not zero has a frequency equal to the switching frequency, so that common-mode current flows in the circuit. If the common-mode current flows out to the commercial power supply 901 or the DC load 902, this can cause erroneous operation of a protection device, or the like. For example, if common-mode current flows into the commercial power supply 901 having the transformer with the neutral point grounded as shown in FIG. 4, large zero-phase current flows via the neutral point 901a. In addition, a capacitance to the ground, of the DC load 902 causes great variation of the potential to the ground, due to the common-mode current, so that high-frequency components of the output voltage outputted to the positive terminal 191P and the negative terminal 191N become unstable. Therefore, it is necessary to prevent the common-mode current from flowing out to the commercial power supply 901 and the DC load 902.

Figure 9:
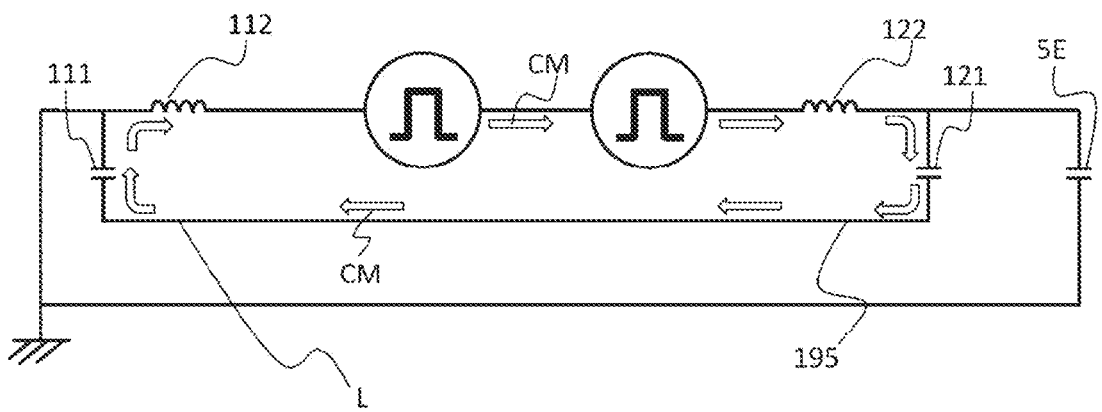
FIG. 9 is an equivalent circuit diagram showing a path through which common-mode current flows, according to embodiment 1.

FIG. 9 is an equivalent circuit diagram showing a path through which the common-mode current flows, according to embodiment 1, and it is assumed that a capacitance 5E to the ground is present on the DC load 902 side. In embodiment 1, the neutral point 111d of the AC filter capacitor unit 111 on the input side and the neutral point 121a of the DC filter capacitor unit 121 on the output side are connected via the neutral point line 195. Therefore, a circulation path L formed by the AC filter capacitor unit 111, the AC filter reactor unit 112, the DC filter reactor unit 122, the DC filter capacitor unit 121, and the neutral point line 195 becomes a path for common-mode current CM, so that common-mode current CM hardly flows to the commercial power supply 901 and the DC load 902 present outside the circulation path L. Thus, since the common-mode current CM is inhibited from flowing out to the DC load 902, high-frequency components of the voltage outputted to the positive terminal 191P and the negative terminal 191N are also stabilized.

The magnitude of the common-mode current CM flowing through the circulation path L is determined by the impedance of the circulation path L. Therefore, in order to further inhibit the common-mode current flowing out to the commercial power supply 901 or the DC load 902, the impedance of the circulation path L needs to be sufficiently smaller than the impedance of an outside path. The impedance of the circulation path L is determined by the impedances of respective parts, and therefore the impedances of the AC filter capacitor unit 111, the AC filter reactor unit 112, the DC filter reactor unit 122, and the DC filter capacitor unit 121 need to be reduced. However, if the impedance of the circulation path L is extremely reduced, the peak value of the common-mode current CM becomes large, leading to increase in loss. Therefore, the impedance of the circulation path L, i.e., the impedances of the AC filter capacitor unit 111 and the like are set to appropriate values on the basis of the balance with the impedances of the commercial power supply 901 and the DC load 902.

As the first semiconductor switching elements 113a to 113f and the second semiconductor switching elements 123a to 123d, semiconductor switching elements such as metal-oxide-semiconductor field-effect transistors (MOSFET) or insulated-gate bipolar transistors (IGBT) may be used. In addition, a MOSFET made of a wide bandgap semiconductor such as silicon carbide may be used, whereby significant reduction in semiconductor loss and speed increase in switching can be achieved. In addition, the second semiconductor switching elements 123a to 123d may be formed by a power module of a 4-in-1 type (including four elements), whereby the full-bridge chopper circuit can be formed by one power module and thus it becomes possible to further reduce the size of the power conversion device 100.

As the capacitors 111a to 111c of the AC filter capacitor unit 111, the capacitor of the DC link capacitor unit 130, and the capacitors 121P, 121N of the DC filter capacitor unit 121, for example, film capacitors may be used.

As described above, in embodiment 1, the full-bridge chopper circuit is used for conversion of the DC link voltage, and therefore variation of the DC component or low-frequency components of 500 Hz or lower of the output voltage is suppressed, so that the low-frequency components are stabilized. In addition, the configuration is simpler than that of a 3-level chopper circuit. For example, two capacitors are needed on the input side in the 3-level chopper circuit, whereas the full-bridge chopper circuit only requires one capacitor.

In addition, in the case of the 3-level chopper circuit, the voltage between the positive terminal and the negative terminal needs to be greater than half the DC link voltage, but in the case of the full-bridge chopper circuit, there are no such constraints. Therefore, the output voltage can be set freely.

According to embodiment 1, the output voltage to the DC load can be stabilized. More specifically, by the full-bridge chopper circuit having the positive leg and the negative leg respectively connected to the positive terminal and the negative terminal on the output side, potentials that are positive-negative symmetric with respect to the neutral point potential are outputted to the positive terminal and the negative terminal, whereby variation of the DC component or low-frequency components of 500 Hz or lower of the output voltage is suppressed. In addition, by the neutral point line which connects the neutral point of the AC filter capacitor unit and the neutral point of the DC filter capacitor unit, and through which the potential at the neutral point of the AC input filter unit and the potential at the neutral point of the DC output filter unit are made to be a common neutral point potential, the circulation path for common-mode current generated through switching operation is formed so as to inhibit the common-mode current from flowing out to the DC load, whereby high-frequency components of the output voltage are stabilized. In this way, while low-frequency components and high-frequency components of the output voltage are stabilized, the number of parts is decreased as compared to the conventional configuration and thus increase in the number of components is suppressed.

In control of the full-bridge chopper circuit, modulation is performed using voltage commands having polarities inverted from each other for the positive leg and the negative leg, and thus the output voltage is alternately switched between the positive leg and the negative leg. Therefore, the frequency component of ripple current flowing through the DC filter reactor unit is doubled in a case of using a half-bridge chopper circuit. Thus, the ripple component of the output voltage can be reduced as compared to the case of using the half-bridge chopper circuit. In addition, if ripple equivalent to that in the case of using the half-bridge chopper circuit is permitted, the size of the DC filter reactor unit can be reduced.

In addition, since the common-mode current is prevented from flowing to the outside of the power conversion device such as the commercial power supply or the DC load as described above, it is possible to inhibit occurrence of erroneous operation of a protection device such as a device for performing ground fault detection for the DC load.

In addition, the inductance with respect to the common-mode current is sufficiently ensured and size reduction can be achieved. More specifically, a three-leg core is applied to the DC filter reactor unit and each leg portion is wound with a winding so that any leg portion can serve as a path for a magnetic flux. Thus, even if the common-mode current flows between the full-bridge chopper circuit, and the positive terminal and the negative terminal, the inductance with respect to the common-mode current can be sufficiently ensured. In addition, since the DC filter reactor unit is formed using a three-leg core, only one three-leg core corresponds to both the positive terminal side and the negative terminal side. Therefore, as compared to a case of using a general two-leg core for each of the positive terminal side and the negative terminal side, the DC filter reactor unit can be further downsized, whereby size reduction in the entire power conversion device 100 can be achieved.

In addition, since the neutral point on the output side of the commercial power supply is grounded, the potentials at the neutral point on the input side and the neutral point on the output side of the power conversion device are equal to the ground potential. Thus, the potentials of the positive terminal and the negative terminal to the ground are stabilized. In addition, insulation designing and protection designing for the power conversion device become easy and thus there is advantage in designing. In addition, the ratio of the AC voltage to the DC link voltage increases so that the voltage usage rate is improved and thus loss is reduced.

Embodiment 2

Figure 10:
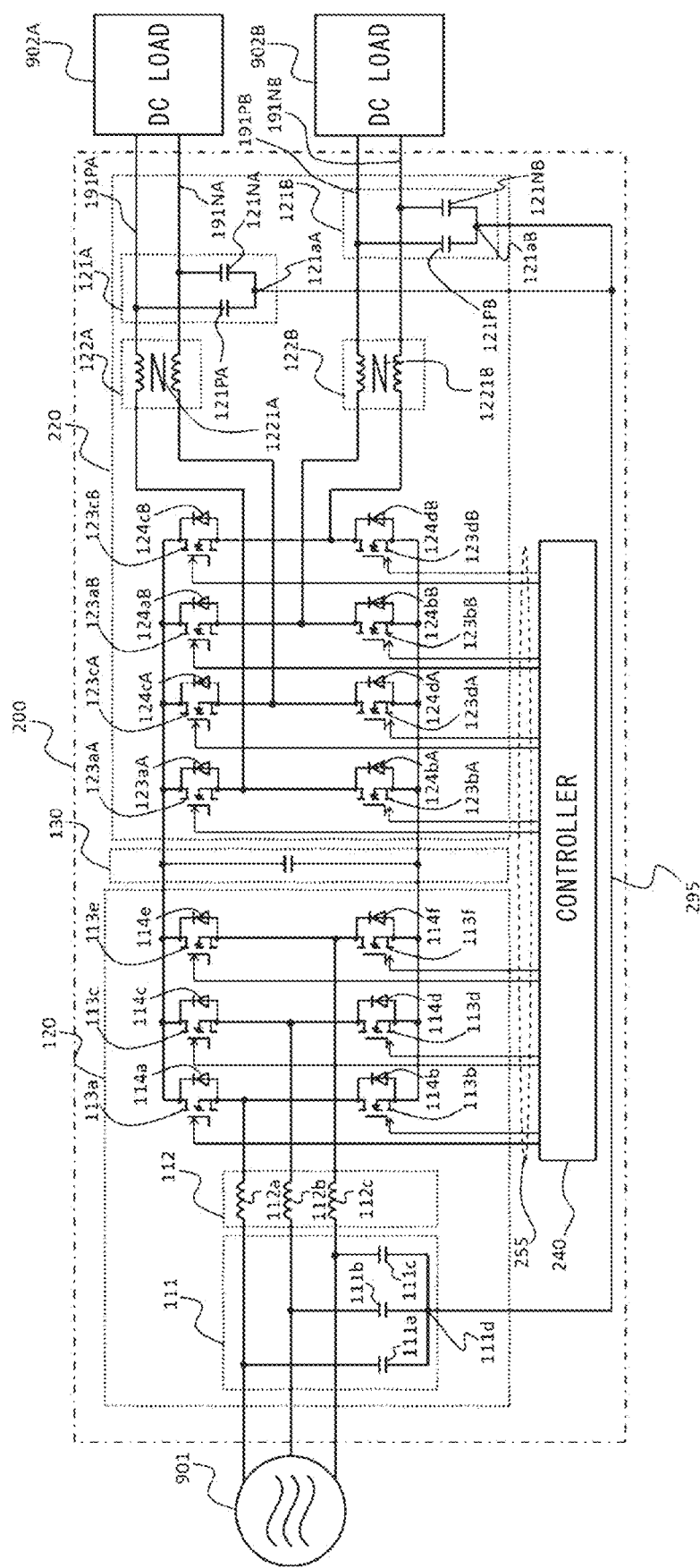
FIG. 10 is a circuit diagram showing a configuration example of a power conversion device according to embodiment 2.
Figure 11:
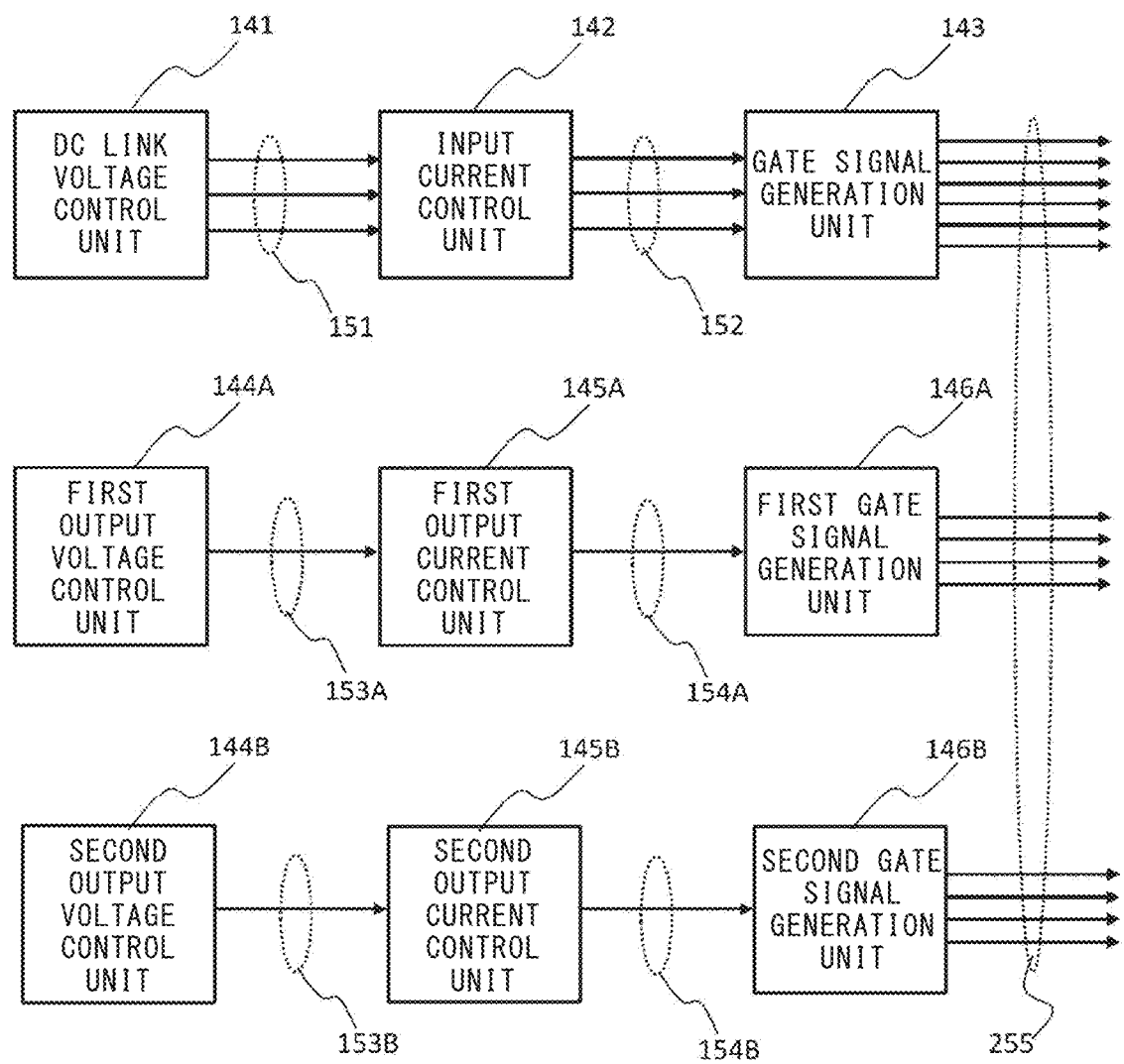
FIG. 11 is a block diagram showing the configuration of a controller according to embodiment 2.

Next, embodiment 2 will be described with reference to FIG. 10 and FIG. 11. Embodiment 2 is different from embodiment 1 in that there are two DC loads. Parts that are the same as or correspond to those in FIG. 1 to FIG. 9 are denoted by the same reference characters, and the description thereof is omitted unless particularly needed. FIG. 10 is a circuit diagram showing a configuration example of a power conversion device according to embodiment 2. For a power conversion device 200, the commercial power supply 901 is connected to the input side and two DC loads 902A, 902B are connected to the output side. The power conversion device 200 has output terminals corresponding to the respective DC loads, and is connected to the DC load 902A via a positive terminal 191PA and a negative terminal 191NA and connected to the DC load 902B via a positive terminal 191PB and a negative terminal 191NB. The power conversion device 200 converts AC voltage supplied from the commercial power supply 901, to desired DC voltage, and supplies the DC voltage to each of the DC loads 902A, 902B. The power conversion device 200 is roughly composed of the AC/DC conversion unit 110 and a full-bridge chopper unit 220. In addition, the power conversion device 200 includes the DC link capacitor unit 130 connected between the AC/DC conversion unit 110 and the full-bridge chopper unit 220, and a controller 240 for controlling semiconductor switching elements provided in the AC/DC conversion unit 110 and the full-bridge chopper unit 220 by gate signals 255. The AC/DC conversion unit 110 and the DC link capacitor unit 130 are the same as those in embodiment 1 and therefore the detailed description thereof is omitted.

The full-bridge chopper unit 220 will be described in detail. The components of the full-bridge chopper unit 220 include components corresponding to the DC load 902A and components corresponding to the DC load 902B. Hereinafter, reference characters for the components similar to those in embodiment 1 are accompanied with "A" or "B" at the ends thereof, to indicate which of the DC load 902A and the DC load 902B each component corresponds to.

The full-bridge chopper unit 220 includes, in the order from the DC load 902A side, a DC filter capacitor unit 121A, a DC filter reactor unit 122A, and second semiconductor switching elements 123aA, 123bA, 123cA, 123dA and second flyback diodes 124aA, 124bA, 124cA, 124dA. The full-bridge chopper unit 220 is connected to the DC load 902A via the positive terminal 191PA and the negative terminal 191NA. In addition, the full-bridge chopper unit 220 includes, in the order from the DC load 902B side, a DC filter capacitor unit 121B, a DC filter reactor unit 122B, and second semiconductor switching elements 123aB, 123bB, 123cB, 123dB and second flyback diodes 124aB, 124bB, 124cB, 124dB. The full-bridge chopper unit 220 is connected to the DC load 902B via the positive terminal 191PB and the negative terminal 191NB.

The DC filter capacitor unit 121A is formed by connecting two capacitors 121PA, 121NA in series via a neutral point 121aA. The capacitor 121PA has one end connected to the positive terminal 191PA and another end connected to the neutral point 121aA. The capacitor 121NA has one end connected to the neutral point 121aA and another end connected to the negative terminal 191NA. The DC filter capacitor unit 121A is formed by connecting two capacitors 121PA, 121NA in series via a neutral point 121aA. The capacitor 121PA has one end connected to the positive terminal 191PA and another end connected to the neutral point 121aA. The capacitor 121NA has one end connected to the neutral point 121aA and another end connected to the negative terminal 191NA. Similarly, the DC filter capacitor unit 121B is formed by connecting two capacitors 121PB, 121NB in series via a neutral point 121aB. The capacitor 121PB has one end connected to the positive terminal 191PB and another end connected to the neutral point 121aB. The capacitor 121NB has one end connected to the neutral point 121aB and another end connected to the negative terminal 191NB.

The neutral point 121aA and the neutral point 121aB are connected to a neutral point line 295. The neutral point line 295 is connected also to the neutral point 111d of the AC filter capacitor unit 111, so that the neutral point 121aA and the neutral point 121aB, and the neutral point 111d, are connected to each other via the neutral point line 295. Thus, the AC filter capacitor unit 111 on the input side and the DC filter capacitor unit 121A and the DC filter capacitor unit 121B on the output side are equal to each other in their neutral point potentials, and have a common neutral point potential.

Circulation paths (not shown) through which common-mode current flows are formed by the neutral point line 295. Specifically, a circulation path is formed by the AC filter capacitor unit 111, the AC filter reactor unit 112, the DC filter reactor unit 122A, the DC filter capacitor unit 121A, and the neutral point line 295. By this circulation path, common-mode current generated through switching operations of the second semiconductor switching elements 123aA to 123dA is inhibited from flowing out to the DC load 902A or the commercial power supply 901. Similarly, a circulation path is formed by the AC filter capacitor unit 111, the AC filter reactor unit 112, the DC filter reactor unit 122B, the DC filter capacitor unit 121B, and the neutral point line 295. By this circulation path, common-mode current generated through switching operations of the second semiconductor switching elements 123aB, 123bB, 123cB, 123dB is inhibited from flowing out to the DC load 902B or the commercial power supply 901. In addition, since the neutral point line 295 connects the neutral point 121aA and the neutral point 121aB, a circulation path (not shown) through which common-mode current flows is also formed between a first full-bridge chopper circuit and a second full-bridge chopper circuit described later.

The DC filter reactor unit 122A and the DC filter reactor unit 122B are respectively formed by three-leg cores 1221A and 1221B. The details thereof are the same as in the DC filter reactor unit 122 of embodiment 1 and therefore the description thereof is omitted.

The second semiconductor switching elements 123aA, 123bA, 123cA, 123dA are connected in a full-bridge form as in the second semiconductor switching elements 123a to 123d of embodiment 1, thus forming the first full-bridge chopper circuit. The second flyback diodes 124aA, 124bA, 124cA, 124dA are respectively connected in antiparallel to the second semiconductor switching elements 123aA, 123bA, 123cA, 123dA. Similarly, the second semiconductor switching elements 123aB, 123bB, 123cB, 123dB are connected in a full-bridge form, thus forming the second full-bridge chopper circuit. The second flyback diodes 124aB, 124bB, 124cB, 124dB are respectively connected in antiparallel to the second semiconductor switching elements 123aB, 123bB, 123cB, 123dB.

The first full-bridge chopper circuit and the second full-bridge chopper circuit, the DC filter capacitor unit 121A and the DC filter capacitor unit 121B, and the DC filter reactor unit 122A and the DC filter reactor unit 122B are respectively connected in parallel to each other.

The controller 240 will be described. FIG. 11 is a block diagram showing the configuration of the controller according to embodiment 2. The controller 240 performs control for the DC link voltage and control for first output voltage and second output voltage in parallel. Here, the "first output voltage" is voltage between the positive terminal 191PA and the negative terminal 191NA. The "second output voltage" is voltage between the positive terminal 191PB and the negative terminal 191NB. The configuration for control for the DC link voltage is the same as that in embodiment 1 and therefore the detailed description thereof is omitted.

A first output voltage control unit 144A calculates a value of a first output current command 153A so that the first output voltage becomes a desired value, and outputs the generated first output current command 153A to a first output current control unit 145A. The first output current control unit 145A calculates a value of a first full-bridge chopper voltage command 154A on the basis of the first output current command 153A, and outputs the generated first full-bridge chopper voltage command 154A to a first gate signal generation unit 146A. The first gate signal generation unit 146A compares the first full-bridge chopper voltage command 154A with a carrier signal, to generate the gate signals 255 for controlling ON/OFF operations of the second semiconductor switching elements 123aA, 123bA, 123cA, 123dA. The first gate signal generation unit 146A outputs the generated gate signals 255 to the second semiconductor switching elements 123aA, 123bA, 123cA, 123dA.

A second output voltage control unit 144B calculates a value of a second output current command 153B so that the second output voltage becomes a desired value, and outputs the generated second output current command 153B to a second output current control unit 145B. The second output current control unit 145B calculates a value of a second full-bridge chopper voltage command 154B on the basis of the second output current command 153B, and outputs the generated second full-bridge chopper voltage command 154B to a second gate signal generation unit 146B. The second gate signal generation unit 146B compares the second full-bridge chopper voltage command 154B with a carrier signal, to generate the gate signals 255 for controlling ON/OFF operations of the second semiconductor switching elements 123aB, 123bB, 123cB, 123dB. The second gate signal generation unit 146B outputs the generated gate signals 255 to the second semiconductor switching elements 123aB, 123bB, 123cB, 123dB.

The first output voltage control unit 144A and the second output voltage control unit 144B operate independently of each other, and the first output current command 153A and the second output current command 153B are independent of each other. The first output current control unit 145A and the second output current control unit 145B operate independently of each other, and the first full-bridge chopper voltage command 154A and the second full-bridge chopper voltage command 154B are independent of each other. Further, the first gate signal generation unit 146A and the second gate signal generation unit 146B operate independently of each other. Therefore, the first output voltage and the second output voltage are controlled independently of each other, and the output voltages different from each other can be outputted to the DC load 902A and the DC load 902B.

The other matters are the same as in embodiment 1 and therefore the description thereof is omitted.

According to embodiment 2, even in the case of having two DC loads, the same effects as in embodiment 1 can be obtained. Although two DC loads are provided in embodiment 2, three or more DC loads may be provided. In essence, the full-bridge chopper unit only has to be made such that the same configuration as in embodiment 1 is provided correspondingly for each DC load and the output voltages for the respective DC loads are controlled independently of each other.

Embodiment 3

Figure 12:
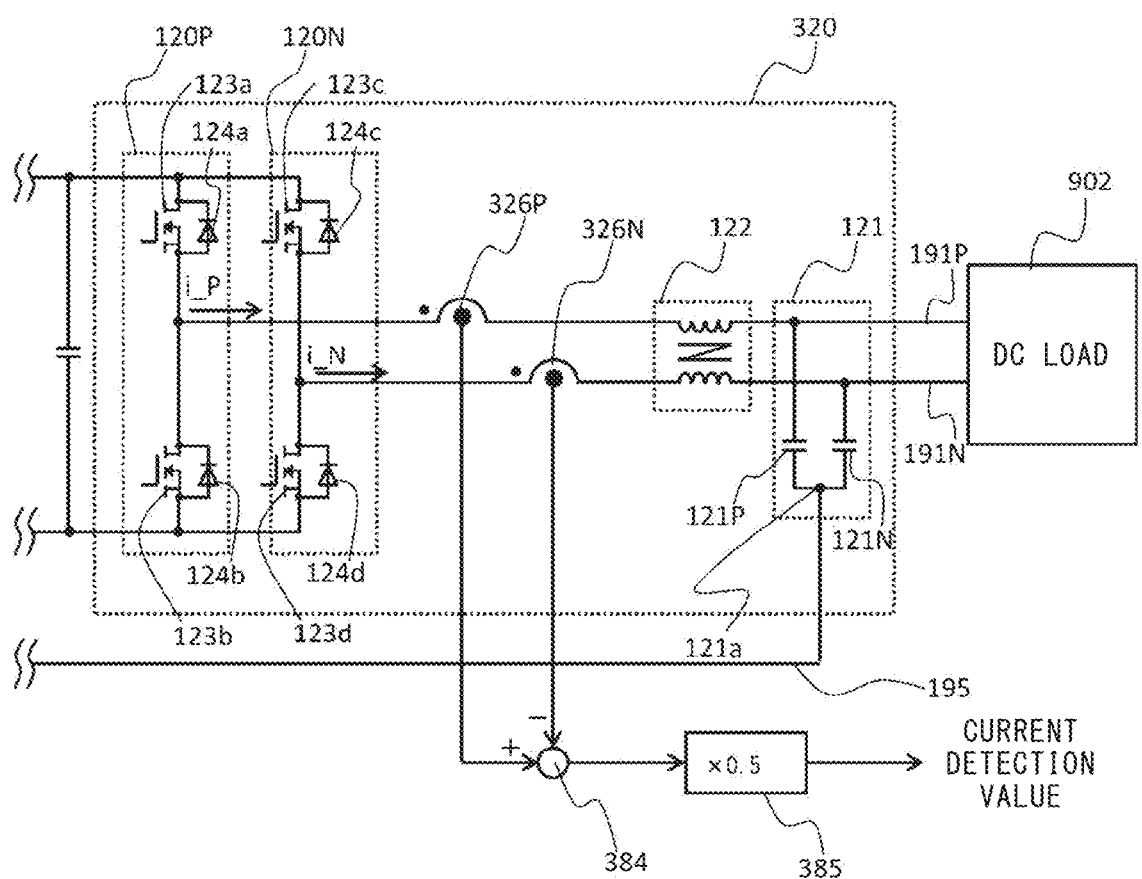
FIG. 12 is a circuit diagram showing a configuration example of a full-bridge chopper unit according to embodiment 3.

Hereinafter, embodiment 3 will be described with reference to FIG. 12. Embodiment 3 is different from embodiment 1 in output current control. Parts that are the same as or correspond to those in FIG. 1 to FIG. 11 are denoted by the same reference characters, and the description thereof is omitted unless particularly needed. FIG. 12 is a circuit diagram showing a configuration example of a full-bridge chopper unit according to embodiment 3. In a full-bridge chopper unit 320, a current sensor 326P for detecting output current i_P flowing from the positive leg 120P to the positive terminal 191P is provided between the positive leg 120P and the DC filter reactor unit 122. In addition, a current sensor 326N for detecting output current i_N flowing from the negative leg 120N to the negative terminal 191N is provided between the negative leg 120N and the DC filter reactor unit 122. The output current i_P detected by the current sensor 326P and the output current i_N detected by the current sensor 326N are sent to a subtractor 384. In embodiment 3, directions from the output terminal of the positive leg 120P and the output terminal of the negative leg 120N toward the positive terminal 191P and the negative terminal 191N (in the drawing, directions in which currents flow in from solid circles) are defined as positive. The current sensors 326P, 326N correspond to a current detection unit.

The subtractor 384 subtracts the output current i_N from the output current i_P and transmits the obtained result to a gain unit 385. The gain unit 385 sends, as a current detection value, a value obtained by multiplying the output of the subtractor 384 by 0.5, to the output current control unit 145. In the output from the positive leg 120P and the output from the negative leg 120N of the full-bridge chopper circuit, normal-mode currents have polarities opposite to each other and have absolute values equal to each other. Therefore, where the common-mode current and the normal-mode current of the output current i_P are denoted by i_CM and i_NM, the following Expressions (1) and (2) are satisfied.

$$i\_P = i\_CM + i\_NM \quad (1)$$

$$i\_N = i\_CM - i\_NM \quad (2)$$

From Expressions (1) and (2), operations of the subtractor 384 and the gain unit 385 are represented by the following Expressions (3) and (4).

$$i\_P - i\_N = (i\_CM + i\_NM) - (i\_CM - i\_NM) = 2 \times i\_NM \quad (3)$$

$$0.5 \times (i\_P - i\_N) = 0.5 \times (2 \times i\_NM) = i\_NM \quad (4)$$

From Expression (4), it is found that the gain unit 385 sends only the normal-mode current i_NM as the current detection value to the output current control unit 145 (not shown).

As described above, the output current control unit 145 calculates the value of the full-bridge chopper voltage command 154 on the basis of the output current command 153 and the "actual output current". The "actual output current" used for the output current control is the current detection value sent to the output current control unit 145, and therefore, in embodiment 3, the current control is performed with only the normal-mode current i_NM regarded as the "actual output current". That is, in embodiment 3, the output current control is performed in a state in which the influence of the common-mode component of the output current is removed.

According to embodiment 3, the same effects as in embodiment 1 can be obtained.

In addition, the output voltage can be more stabilized. More specifically, in control for the output current, the current detection value from which the influence of the common-mode component is removed is used. Thus, for example, occurrence of resonance current that would be caused by each filter can be prevented, whereby variation of the output voltage due to the common-mode component can be suppressed. Thus, the output voltage can be more stabilized.

In addition, in the case of considering only the normal-mode current in current control, it suffices that the output current is controlled by a single current control system and then symmetric operation is merely performed. Thus, the output current control is simplified.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100, 200 power conversion device
110 AC/DC conversion unit
111 AC filter capacitor unit
111a to 111c capacitor
111d neutral point
113a to 113f first semiconductor switching element
120, 220, 320 full-bridge chopper unit
120P positive leg
120N negative leg
121, 121A, 121B DC filter capacitor unit
121P, 121N, 121PA, 121NA, 121PB, 121NB capacitor
121a, 121aA, 121aB neutral point
122, 122A, 122B DC filter reactor unit
1221, 1221A, 1221B three-leg core
1221a to 1221c leg portion
123a to 123d, 123aA, 123bA, 123cA, 123dA, 123aB, 123bB, 123cB, 123dB second semiconductor switching element
140, 240 controller
143, 146 gate signal generation unit
144 output voltage control unit
145 output current control unit
144A first output voltage control unit
144B second output voltage control unit
145A first output current control unit
145B second output current control unit
146A first gate signal generation unit
146B second gate signal generation unit
153 output current command
153A first output current command
153B second output current command
154A first full-bridge chopper voltage command
154B second full-bridge chopper voltage command
155, 255 gate signal
191P, 191PA, 191PB positive terminal
191N, 191NA, 191NB negative terminal
195, 295 neutral point line
326P, 326N current sensor
384 subtractor
385 gain unit
563 inversion unit 901 commercial power supply
9011 primary-side coil
9012 secondary-side coil
901a neutral point
902, 902A, 902B DC load
CM common-mode current
i_P, i_N output current
L circulation path

The invention claimed is:

1. A power conversion device which converts AC voltage from an AC power supply to DC voltage, further converts the DC voltage to desired DC voltage, and outputs the desired DC voltage to a DC load via a positive terminal and a negative terminal, the power conversion device comprising:
   a power conversion circuit which includes a plurality of first semiconductor switching elements connected in a bridge form, and which converts the AC voltage to DC voltage and outputs the DC voltage as DC link voltage;
   an AC filter capacitor unit connected between the AC power supply and the power conversion circuit, and having capacitors corresponding to respective phases of the AC voltage;
   a full-bridge chopper circuit including a plurality of second semiconductor switching elements connected so as to form a full-bridge circuit, the full-bridge chopper circuit having a positive leg and a negative leg respectively connected to the positive terminal and the negative terminal;
   a DC filter capacitor unit and a DC filter reactor unit connected between the full-bridge chopper circuit, and the positive terminal and the negative terminal;
   a neutral point line which connects a neutral point of the AC filter capacitor unit and a neutral point of the DC filter capacitor unit and through which a potential at the neutral point of the AC filter capacitor unit and a potential at the neutral point of the DC filter capacitor unit are made to be a common neutral point potential, the neutral point line not being connected to a ground point of which a potential is a ground potential;
   a controller for controlling the first semiconductor switching elements and the second semiconductor switching elements; and
   a current detector for detecting output current from the full-bridge chopper circuit, wherein
   the controller controls the plurality of second semiconductor switching elements on the basis of an output current command based on a predetermined value of output voltage, and a current detection value obtained by removing a common-mode component from the output current detected by the current detector, and
   the AC power supply includes a transformer of which a neutral point on an output side is grounded, and a potential of the neutral point line is equal to the ground potential.

2. The power conversion device according to claim 1, wherein
   the current detector includes
      a first current detector for detecting current between the positive leg of the full-bridge chopper circuit and the positive terminal, and
      a second current detector for detecting current between the negative leg of the full-bridge chopper circuit and the negative terminal, and
   the controller controls the plurality of second semiconductor switching elements on the basis of a current detection value obtained from a difference between a current value detected by the first current detector and a current value detected by the second current detector.

3. The power conversion device according to claim 2, further comprising:
   a subtractor which receives the current value detected by the first current detector and the current value detected by the second current detector, and outputs the difference; and
   a gain unit which receives the difference outputted from the subtractor, and outputs, as the current detection value, a value obtained by multiplying the difference by a predetermined gain, to the controller.

4. The power conversion device according to claim 3, wherein
   the controller controls the first semiconductor switching elements so that zero-phase voltage of the AC power supply becomes zero.

5. The power conversion device according to claim 3, wherein
   the DC filter reactor unit includes a three-leg core having a first leg portion wound with a winding connected to the positive terminal, a second leg portion wound with a winding connected to the negative terminal, and a third leg portion.

6. The power conversion device according to claim 2, wherein
   the controller controls the first semiconductor switching elements so that zero-phase voltage of the AC power supply becomes zero.

7. The power conversion device according to claim 2, wherein
   the DC filter reactor unit includes a three-leg core having a first leg portion wound with a winding connected to the positive terminal, a second leg portion wound with a winding connected to the negative terminal, and a third leg portion.

8. The power conversion device according to claim 2, the power conversion device being a power conversion device that outputs DC voltage to each of a plurality of DC loads, wherein
   a plurality of the full-bridge chopper circuits, a plurality of the DC filter capacitor units, and a plurality of the DC filter reactor units are provided correspondingly for the respective plurality of DC loads.

9. The power conversion device according to claim 2, wherein
   the controller controls the second semiconductor switching elements so that a potential of the positive terminal and a potential of the negative terminal with respect to the neutral point potential become positive-negative symmetric.

10. The power conversion device according to claim 2, wherein
    in generating gate signals for controlling the second semiconductor switching elements, the controller performs modulation by using a first voltage command and a second voltage command having a polarity inverted from the first voltage command with respect to the same carrier signal.

11. The power conversion device according to claim 2, wherein
    the second semiconductor switching elements are incorporated in one power module.

12. The power conversion device according to claim 2, wherein the first semiconductor switching elements and the second semiconductor switching elements are made of a wide bandgap semiconductor.

13. The power conversion device according to claim 1, wherein
the controller controls the first semiconductor switching elements so that zero-phase voltage of the AC power supply becomes zero.

14. The power conversion device according to claim 1, wherein
the DC filter reactor unit includes a three-leg core having a first leg portion wound with a winding connected to the positive terminal, a second leg portion wound with a winding connected to the negative terminal, and a third leg portion.

15. The power conversion device according to claim 1, the power conversion device being a power conversion device that outputs DC voltage to each of a plurality of DC loads, wherein
a plurality of the full-bridge chopper circuits, a plurality of the DC filter capacitor units, and a plurality of the DC filter reactor units are provided correspondingly for the respective plurality of DC loads.

16. The power conversion device according to claim 1, wherein
the controller controls the second semiconductor switching elements so that a potential of the positive terminal and a potential of the negative terminal with respect to the neutral point potential become positive-negative symmetric.

17. The power conversion device according to claim 1, wherein
in generating gate signals for controlling the second semiconductor switching elements, the controller performs modulation by using a first voltage command and a second voltage command having a polarity inverted from the first voltage command with respect to the same carrier signal.

18. The power conversion device according to claim 1, wherein
the second semiconductor switching elements are incorporated in one power module.

19. The power conversion device according to claim 1, wherein
the first semiconductor switching elements and the second semiconductor switching elements are made of a wide bandgap semiconductor.

20. The power conversion device according to claim 19, wherein
the wide bandgap semiconductor is silicon carbide.

* * * * *